(12) United States Patent
Jones

(10) Patent No.: US 6,606,506 B1
(45) Date of Patent: Aug. 12, 2003

(54) PERSONAL ENTERTAINMENT AND COMMUNICATION DEVICE

(76) Inventor: Albert C. Jones, 1506-203 Kelston Pl., Charlotte, NC (US) 28212

( * ) Notice: Subject to any disclaimer, the term of this patent is extended or adjusted under 35 U.S.C. 154(b) by 0 days.

(21) Appl. No.: 09/444,331

(22) Filed: Nov. 19, 1999

Related U.S. Application Data

(60) Provisional application No. 60/109,100, filed on Nov. 19, 1998.

(51) Int. Cl.$^7$ .............................. H04B 1/38; H04M 1/00
(52) U.S. Cl. ...................... 455/556; 455/566; 455/88; 455/568
(58) Field of Search .................. 455/556, 88, 568, 455/90, 575, 566; 340/825.37

(56) References Cited

U.S. PATENT DOCUMENTS

| | | | | |
|---|---|---|---|---|
| 4,145,720 A | * | 3/1979 | Weintraub et al. ............. | 455/20 |
| 5,771,441 A | * | 6/1998 | Altstatt ........................ | 343/718 |
| 5,786,923 A | * | 7/1998 | Doucet et al. ............... | 359/118 |
| 5,804,829 A | * | 9/1998 | Palmer .................... | 250/504 H |
| 5,805,530 A | * | 9/1998 | Youngberg ................... | 368/10 |
| 5,920,270 A | * | 7/1999 | Peterson ................. | 340/825.37 |
| 5,978,689 A | * | 11/1999 | Tuoriniemi et al. .......... | 455/351 |
| 5,983,100 A | * | 11/1999 | Johansson et al. ........... | 455/426 |
| 5,991,637 A | * | 11/1999 | Mack et al. ................. | 455/550 |
| 6,006,115 A | * | 12/1999 | Wingate ................. | 379/110.01 |
| 6,212,282 B1 | * | 4/2001 | Mershon ....................... | 381/77 |
| 6,263,218 B1 | * | 7/2001 | Kita ........................... | 455/567 |
| 6,300,880 B1 | * | 10/2001 | Sitnik .......................... | 235/375 |
| 6,301,490 B1 | * | 10/2001 | Callan ........................ | 455/568 |

* cited by examiner

*Primary Examiner*—Edward F. Urban
*Assistant Examiner*—Marceau Milord
(74) *Attorney, Agent, or Firm*—Dougherty, Clements & Hofer

(57) ABSTRACT

A personal entertainment and communication device having a headset that is electronically connected to a master unit via a flexible connecting cable. A digital music player and a microphone are included in the headset. A hinged door on the headset opens to accept a flash memory module or minidisk containing encoded digital music. The master unit includes a pager, a cellular telephone, a radio, digital music controls, radio controls, and time of day functions that permit the headset and master unit to act as a simple pocket watch. The user is alerted through the headset, even while music is playing from the radio or the digital music player that a call or page has been received.

13 Claims, 6 Drawing Sheets

PERSONAL ENTERTAINMENT AND COMMUNICATION DEVICE

CROSS REFERENCE OF RELATED APPLICATION

This application claims the benefit of U.S. Provisional Application No. 60/109,100, filed on Nov. 19, 1998.

FIELD OF THE INVENTION

The present invention relates generally to portable electronic devices and, in particular, to devices having various combinations of a digital music player, a radio, a cellular telephone, a pager, a watch and a timer.

BACKGROUND OF THE INVENTION

Various conventional entertainment devices are useful for providing leisure activities. Communication devices are useful for providing communication links between various segments of society. In both cases, the portability of an entertainment device and/or communication device is desirable in order for such leisure activities or communication links to be accomplished without limitations to a particular location. For example, a portable tape player, such as a Walkman manufactured by Sony Corporation, allows a user to listen to music while away from home or without being restricted to the confines of the home. Another example is a cellular telephone that allows communication to be established between the user and another party without the constraints of a base unit or a telephone cord.

Currently, in order to obtain the benefits of different entertainment devices, such as a personal portable radio, a portable CD player, and portable tape player, and/or communication devices, such as a pager and a cellular telephone, each device must be purchased separately and carried by the user. Carrying all of such devices in order to have them readily accessible to the user is burdensome and requires valuable space for such devices, particularly when traveling outdoors. Additionally, clutter is created without the assistance of a bag to hold all of such devices.

What is therefore needed is a personal entertainment and communication device having multiple entertainment functions in combination with communication functions in a single device. Further needed is a portable entertainment and communication device that provides high fidelity music from radio transmission, pre-recorded music, or downloadable digitized music from the Internet. Further needed is a portable entertainment and communication device that provides cellular telephone and pager capabilities in a light weight unit. Further needed is a portable entertainment and communication device having ergonomic function controls.

SUMMARY OF THE INVENTION

The personal entertainment and communication device of the present invention includes a headset that incorporates a first electronics package for effecting pre-determined features thereof and a control/display unit communicably linked to the headset that incorporates a second electronics package contained therein. The control/display unit allows the user to select and/or control the predetermined features and to display relevant information, such as paging information, time and timer data. Additionally, the control/display unit is an extended keypad having touch screen capability incorporated in the control/display unit.

The headset includes a loudspeaker for each ear, an amplifier operatively connected to the loudspeakers, a mechanism for connecting a source of prerecorded digital music, and a microphone. The control/display unit includes an AM/FM radio tuner operatively connected to the amplifier, a cellular telephone receiver/decoder operatively connected to the amplifier, a cellular telephone transmitter operatively connected to the microphone, a microprocessor for decompressing a prerecorded digital music medium that includes a time-of-day and timer feature and an audio response feature for display-less operation, a bidirectional interface for receiving control information related to the above functions that is preferably connected to the second electronic partition, antennas for the radio and cellular telephony features, and a power source which may be a battery or battery/solar cell combination.

The second electronics package includes a keypad for user control of the pre-determined features, for example placing cellular telephone calls or selecting radio bands or stations. The second electronics package further contains means to communicate with the headset mounted electronics. The second electronics package further contains a visual display capable of displaying time-of-day data, cellular telephone data, and pager data. Additionally, the second electronics package includes soft keys to assist the user in navigating menus associated with the pre-determined features for controlling the various functions of the same. The second electronics package includes a small container housing, the keypad, and display in a convenient size for ergonomic use.

OBJECT OF THE INVENTION

The principal object of the invention is to provide a personal, portable entertainment and communication device for a person on the move.

A further object of the invention is to provide high fidelity portable music from off-the-air or a full hour of prerecorded music as the user selects.

A further object of the invention is to provide a personal, portable entertainment and communication device having both cellular telephone and pager capability via a light weight, logical fashion.

A further object of the invention is to provide a personal, portable entertainment and communication device that has real time features of time, day, month, and year as well as flexible timer functions.

A further object of the invention is to provide the user with flexible ergonomically superior means to control the manifold functions of the invention by a keypad with an ergonomically optimized division of function control into touch-screen menu navigation and preprinted key tops.

A further object of the invention is to provide an optimally rugged device with substantially no moving parts.

DETAILED DESCRIPTION

Figure 1:
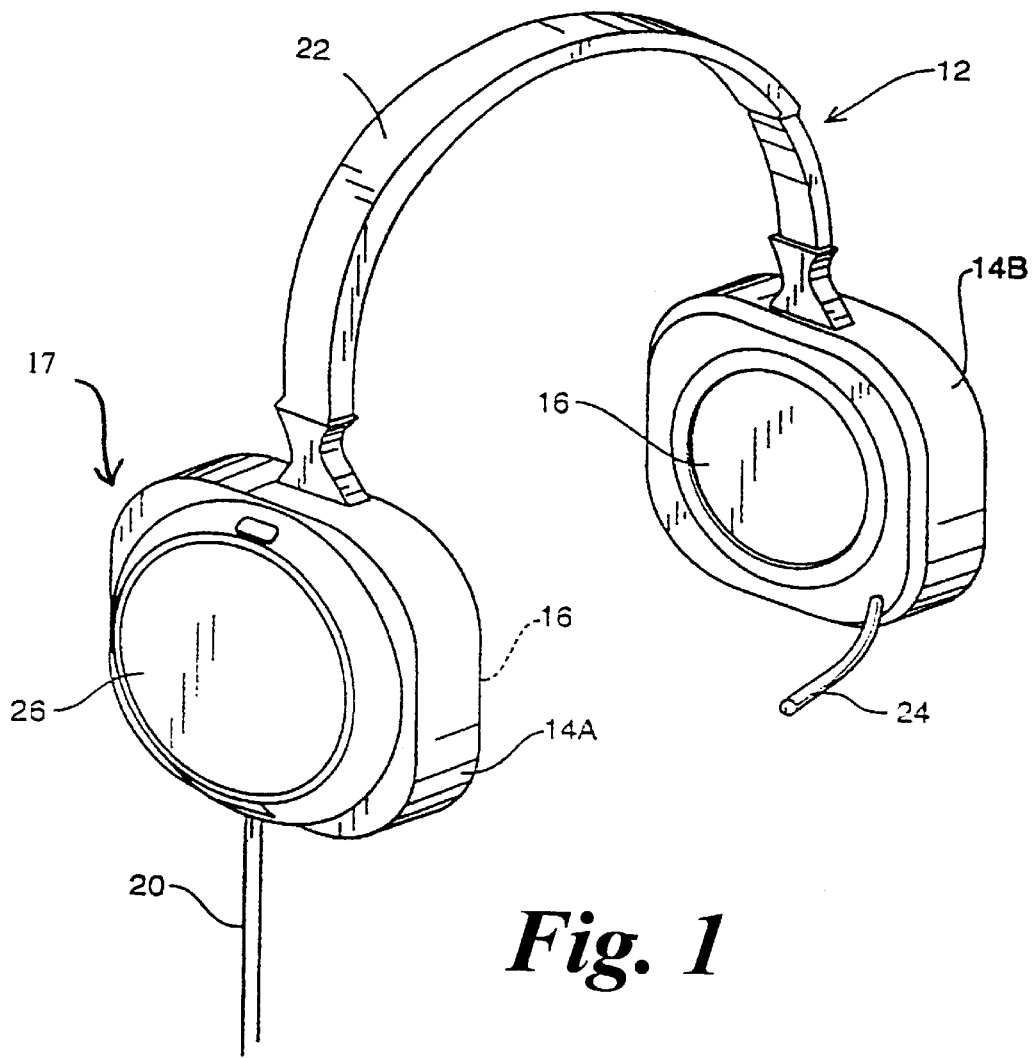
FIG. 1 is a perspective view of a headset portion of the personal entertainment and communication device of the present invention.

FIG. 1 is a perspective view of a headset portion of the personal entertainment and communication device of the present invention. The personal entertainment and communication device of the present invention includes a headset 12 having a first electronics package and a control/display unit, shown generally at 18 (FIG. 2), having a second electronics package that is linked electronically to the headset 23. The headset 12 includes a first speaker housing 14A and a second speaker housing 14B, each having a speaker 16 positioned conventionally for headphones, to play sounds into the ears of a user (not shown). A digital music source, shown generally at 17, is coupled to one of the speaker housings 14A, 14B. Additionally, the headset 12 contains the electronics for implementing the audio-related functions of the device.

The digital music source 65 (FIG. 4) is preferably a conventional flash memory module. An example of a digital music source is a 32-Megabyte module that contains one hour of high fidelity music. The module is preferably encoded using MP-3 technology. A prerecorded module is inserted into the headset 12 and electrically connected to a first electronics package via a hatchway 26. The hatchway 26 is preferably a circular cover having a latch positioned at the top of the hatchway 26 and that opens downwardly from the latch. In an alternative embodiment, the digital music source 65 is a minidisk module. Conventional minidisks typically are capable of storing about 60 minutes of music. The minidisk module is likewise inserted into the headset 12 and electrically connected to the first electronics package via the hatchway 26.

Antennas for a cellular telephone, described in greater detail hereinafter, and an AM/FM radio, described in greater detail hereinafter, are preferably incorporated in a head band 22. When using higher bandwidth range options an external antenna (not shown) may be provided. A microphone 24 is shown incorporated in the left headphone of the headset 12. Alternatively, the microphone 24 may be incorporated in the right headphone of the headset 12. The headset 12 is preferably receives power via a cable 20 from the control/display unit 18, or master unit, since the headset 12 contains no volatile storage, or storage that is lost when the power is removed, that cannot be quickly restored when the invented device is powered.

Figure 2:
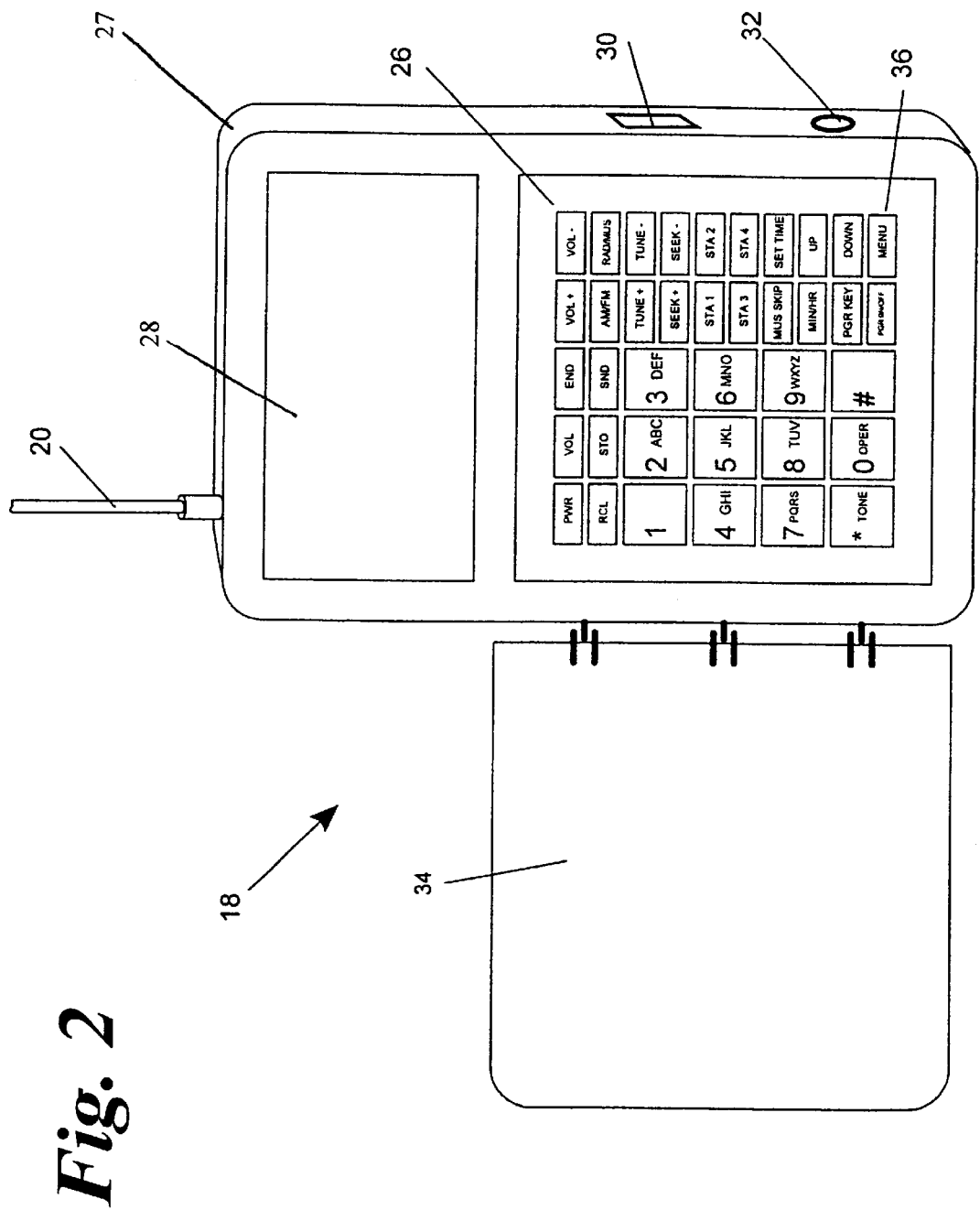
FIG. 2 is a perspective view of a control/display unit portion of the personal entertainment and communication device of the present invention.

FIG. 2 is a perspective view of the control/display unit 18 of the personal entertainment and communication device of the present invention. The control/display unit 18 includes an AM/FM radio tuner 60 (FIG. 4) that is operatively connected to an amplifier 62 (FIG. 4), a cellular telephone receiver/decoder 56, (FIG. 4) operatively connected to the amplifier 62, a cellular telephone transmitter 56 operatively connected to the microphone 24, a microprocessor 68 for decompressing a prerecorded digital music medium that includes a time-of-day and timer feature and an audio response feature for display-less operation, a bidirectional interface for receiving control information related to the above functions that is preferably connected to the second electronics package, antennas for the radio and cellular telephony features, and a power source which may be a battery or battery/solar cell combination.

The second electronics package includes a keypad 26 for user control of the pre-determined features, for example placing cellular telephone calls or selecting radio bands or stations. The second electronics package further contains means to communicate with the headset mounted electronics. The second electronics package further contains a visual display 28 capable of displaying time-of-day data, cellular telephone data, and pager data. Additionally, the second electronics package includes soft keys to assist the user in navigating menus associated with the pre-determined features for controlling the various functions of the same. The second electronics package includes a small container housing 27, the keypad 26, and display 28 in a convenient size for ergonomic use.

The control/display unit 18 allows the user to select and/or control the pre-determined features and to display relevant information, such as paging information, time and timer data. As previously mentioned, the control/display unit 18 is electronically connected to the headset 12 via a flexible connecting cable 20. The number of conductors in the cable 20 is minimized by using conventional inter-integrated-circuit interconnection technology, for example, I$^2$C (a trademark of Philips Corporation) is such a technology. Using such technology permits the cable to have a small cross section and flexibility comparable to headsets that consist of headphones only.

The control/display unit 18 contains a keypad 26 that is preferably fabricated with flexible printed circuits such that the user deflects a metal trace from the user side circuit until contact is made with an orthogonal trace. The traces are separated by a thin plastic sheet with holes that align with a printed key top nomenclature. A tradeoff exists between the size and ease of use of the keypad 26 and the functions implemented therein. The core area of the keypad 26 includes a cellular phone area. The top portion of the switch array of the keypad 26 is transparent and extends over a visual display 28 allowing sophisticated set up of user options. The soft key functions are evoked by pressing a lower right key 36 marked "menu". The display 28 then presents the user with a set of choices, up to six choices at each level. In just four selections, the user can navigate to more than 1000 different outcomes. The options are arranged in a treelike structure such that each selection evokes a new set of choices. For example, the user may wish to hear a tone in the headset 12 if a page arrives, or the user may wish a canned message, such as "page received", to interrupt the current presentation in the headset 12. With minimal impact on the battery life, the user's menu selections may be retained when the display 28 is off.

The visual display 28 is preferably a color-compensated "super-twist" Liquid Crystal Display or equivalent. With color compensation, the display will appear black and white and present a wide viewing angle and high contrast. The display 28 needs external light for visibility, low light features can be added as an option, via edge lighting the keypad and display. The content should exceed 50 ×100 picture elements, which permits the display of approximately 50 characters or 8-character labels for each soft key. In an alternative embodiment, the display 28 exhibits color. A touch screen overlay that is a transparent extension of the keypad 26 preferably has multiple select points, and more preferably six; three just left of the vertical centerline of the display 28 and three just left of the right-hand edge. A two position slide switch 30 on the side of control/display unit 18 allows the user to select entertainment or cellular telephone electronic states. A female jack 32 allows for the use of a battery eliminator/charger. A hinged cover 34 can be used to cover the keypad 26 thereby preventing inadvertent actuation. The hinged cover 34 allows the time, timer and pager functions to be displayed and viewed with the keypad 26 covered. A menu mode cannot be evoked without activation of the "menu" key 36.

Figure 3:
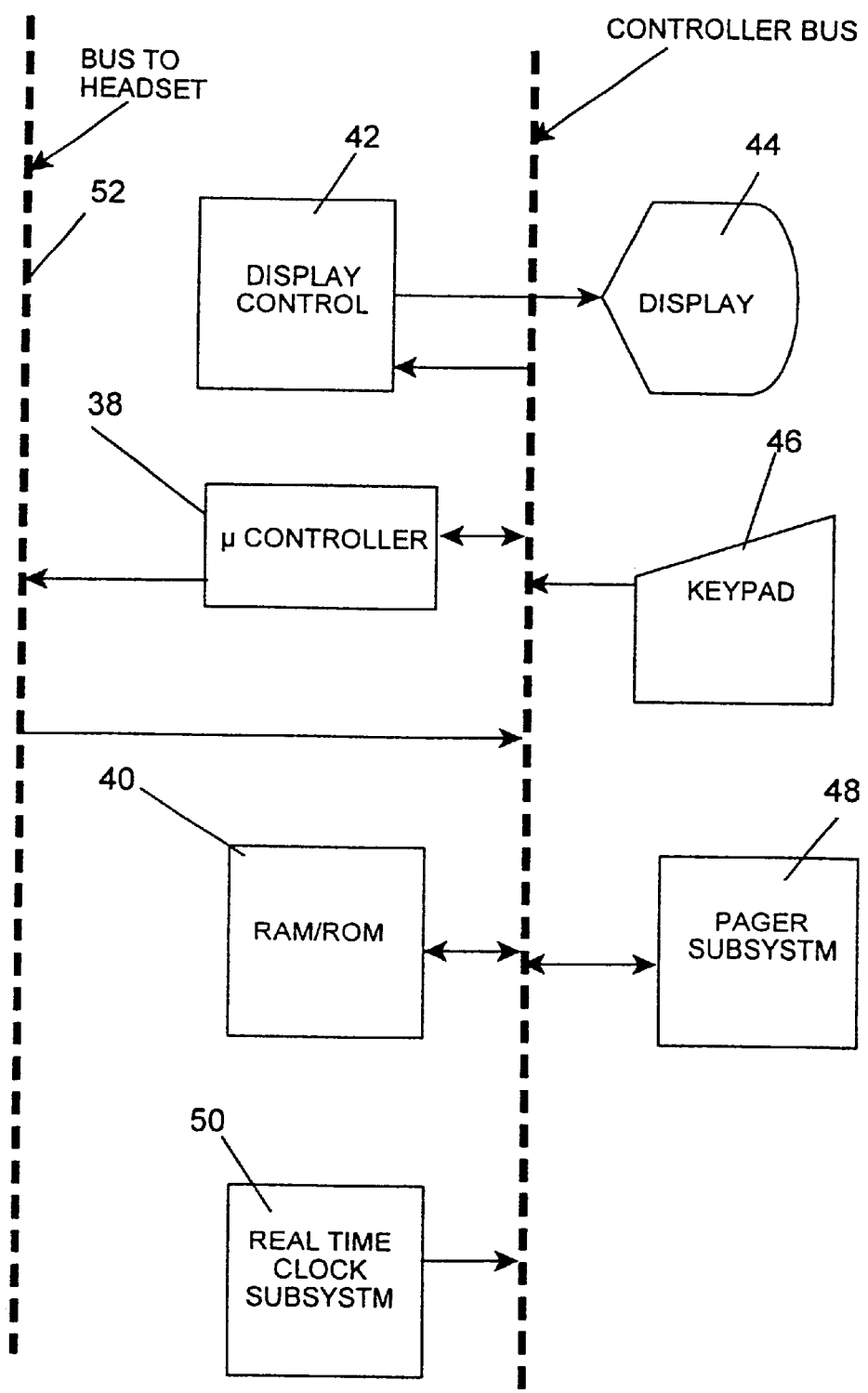
FIG. 3 is a block schematic diagram of the headset portion of the personal entertainment and communication device of the present invention.

FIG. 3 is a block schematic diagram of the control/display unit 18 of the personal entertainment and communication device. The master unit 18 includes a microcontroller 38 that executes a set of programs permanently contained in read only memory, ROM, with branching resulting from user interactions stored in random access memory, RAM, in a memory subsystem 40. The controller 38 is an entry-level microcomputer since there are no significant speed or computational demands. Attached to a controller bus are the principle systems of the control/display unit 18. The display control 42 converts the character stream desired into the picture element pattern on the display 44 and cycles the display according to the display's technical requirements, typically every 20 milliseconds.

A keypad subsystem 46 polls a switch array and interprets contact at a cross point as a "hit" of the printed or soft keys as the case may be. A pager subsystem 48 contains an antenna and actively receives and screens received data for address information. Upon detecting the address, the pager subsystem 48 passes received data to the microcontroller 38 for disposition. In one embodiment, the received message is provided on the display 44, and the user is alerted via a tone or a canned message that a page has been received. Alternatively, an audio response unit can be evoked to audibly present a received call-back number.

A real time clock subsystem 50 keeps time and provides the data for timer functions that are executed in the controller 38. The time (e.g., month, day, year, time of day, and time zone) is displayed and continuously updated when the display 28 is not in soft key mode. If the user has set timer functions, the microcontroller 38 can use the data from the subsystem 50 to track each timer and, when appropriate, display results. Any issues dealing with audible functions are present to the inter-integrated-circuit bus ($I^2C$ or equivalent). The $I^2C$ bus is a serial bus with a device address followed by data. Each component of the invention that is connected to the bus screens the data stream for the particular component's address. Upon detecting the appropriate address, the component captures the immediately following data, acts on the data, and releases the bus. Typically, a twisted pair (e.g., two fine wires, insulated and twisted together) are used for a control bus. Simplex buses use two twisted pairs for data from the headset 12 and for data to the headset 12. Duplex buses use a single twisted pair which could be "turned around" at either end of the bus. Any of the aforementioned bus configurations are appropriate for the present invention.

Figure 4:
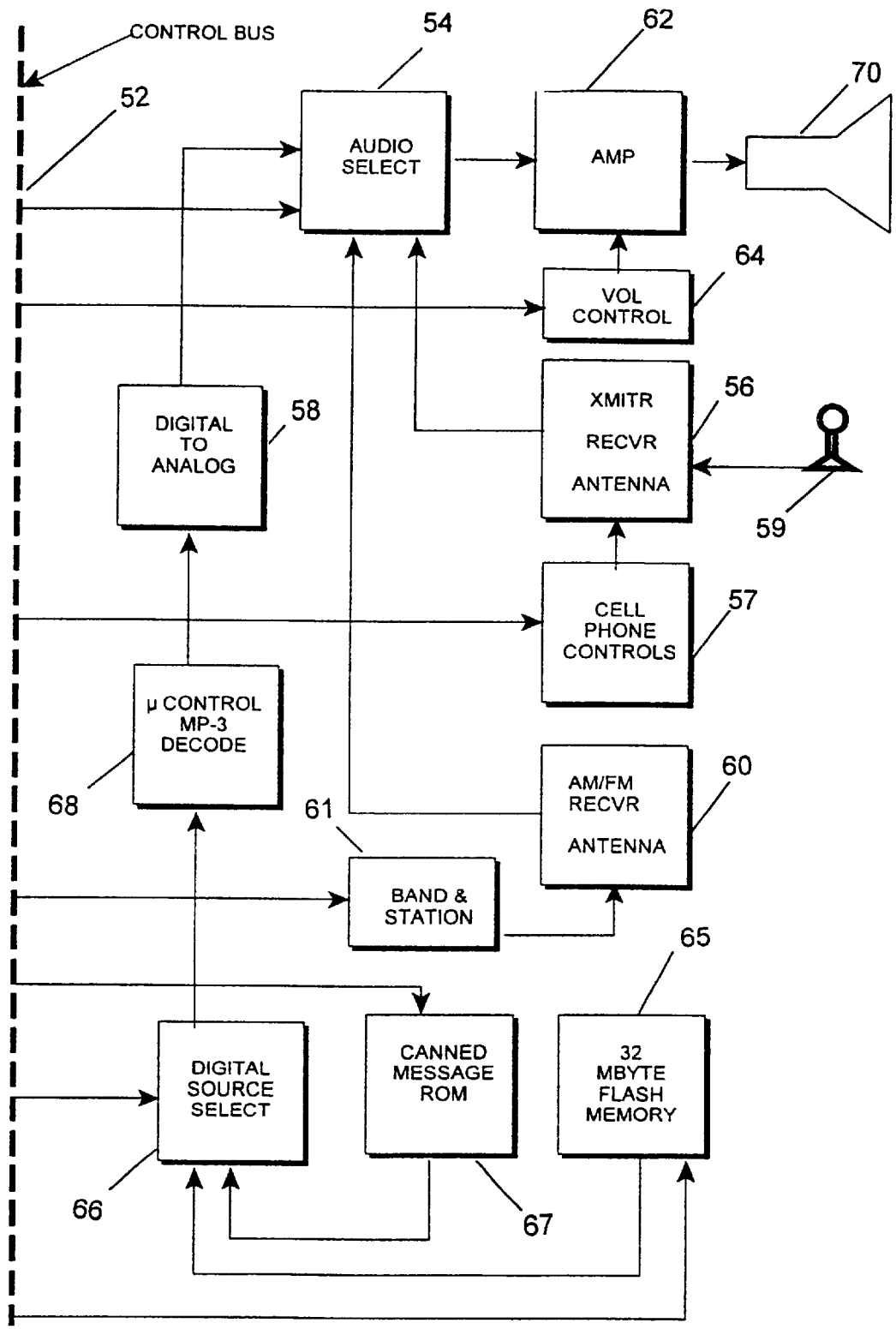
FIG. 4 is a block schematic diagram of the control/display unit portion of the personal entertainment and communication device of the present invention.

FIG. 4 is a block schematic diagram of the control/display unit 18 of the personal entertainment and communication device of the present invention. An audio select subsystem 54, under command of the control bus, selects from three potential audio sources: a cellular phone subsystem 56; a digital to analog converter 58; or, the AM/FM radio 60. The amplifiers 62 are subject to volume control 64 as directed by the control bus. Although only one amplifier is shown, an amplifier is required for each ear for stereo presentation. Cellular telephone controls 57 are also under the control of the control bus 52. The microphone 59 is operatively connected to the cellular telephone subsystem 56. The AM/FM radio 60 is tuned to a band and station as directed by the control bus via a radio control 61.

Figure 5:
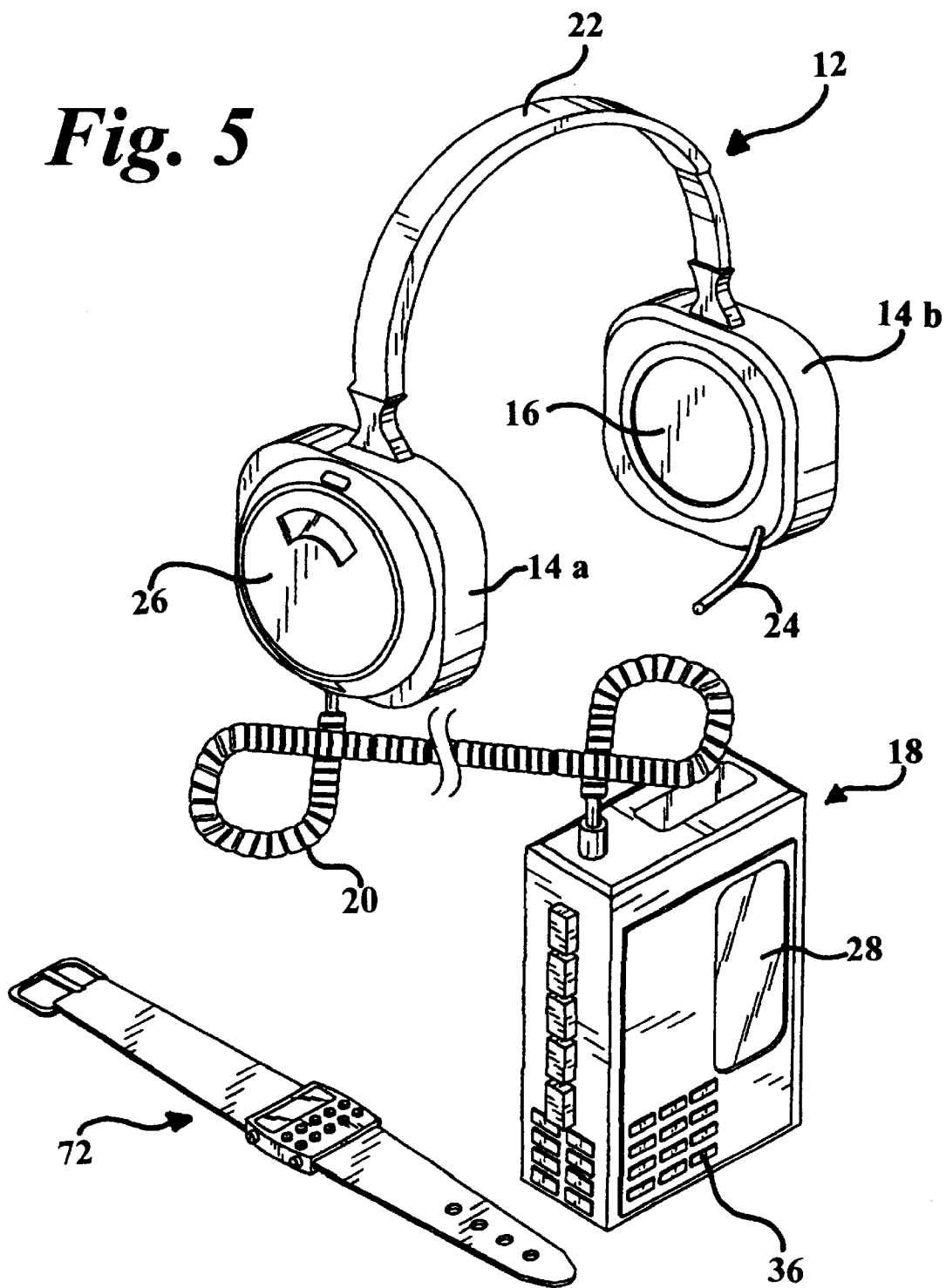
FIG. 5 is a prospective view of an alternative embodiment of the present invention wherein a remote control unit is utilized in addition to the master control.

FIG. 5 is a prospective view of an alternative embodiment of the present invention. The alternative personal entertainment and communication device 10 includes the headset 12 having a first electronics package and a remote control/display unit 72, having a second electronics package that is communicably linked to the headset 12. The headset 12 of the alternative embodiment is configured as for the preferred embodiment, including the first speaker housing 14(a) and the second speaker housing 14(b), each having a speaker 16 position conventionally for headphones. The communication link between the remote control/display unit 72 and headset 12 is preferably a wireless transmitter/receiver type arrangement. However, it will be appreciated by those skilled in the art that any wireless communication arrangement may be employed for signal and control transmission.

Figure 6:
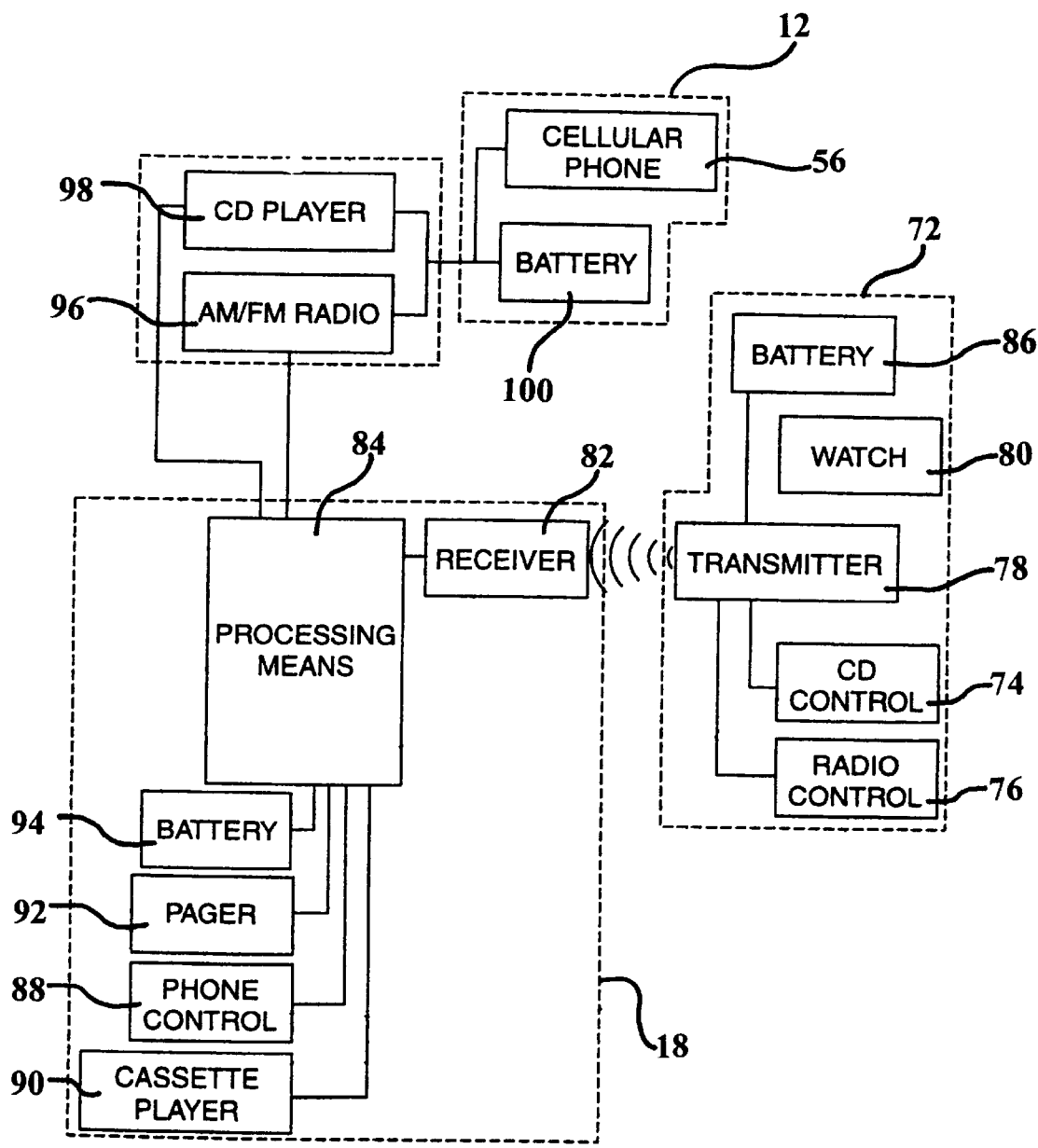
FIG. 6 is a block schematic diagram of the alternative personal entertainment device of the present invention as shown in FIG. 5.

FIG. 6 is a block schematic diagram of the alternative embodiment as shown in FIG. 5. As illustrated, the remote control/display unit 72 includes CD controls 74, radio controls 76, a transmitter 78, and a time/clock display panel 80. In operation, the transmitter 78 transmits control signals to a receiver 82 conventionally housed within the headset 12. The transmission is performed in a conventional manner to control the radio 96 and CD 98 by a processing means 84. A second battery unit 86 provides power to the remote control/display unit 72 and is housed therein.

The master control unit 18 includes the processing means 84, the receiver 82, the phone controls 88, the pager 92 which includes the pager controls, and a tape player 90, which includes a tape player control. A third battery 94 powers the processing means, the cassette player, the pager, and the receiver.

The remote unit 72 includes the CD controls 74, the radio controls 76, the transmitter 78, and the time/clock display 80. The transmitter 78 transmits control signals to the receiver 82 in a known manner to control the radio 96, the CD player 98, the pager 92, and the cell phone 56 through the processing means 84 located in the master control unit 18. A fourth battery 100 is provided in order to provide power to the headset 12.

The processing means 84 is configured so as to play a soft beep through the speakers 16, even while music is being played, to alert the user that a page or a call has been received. When a call is received, the user takes the call by manipulating the phone controls 88, and the music or other sounds being played through the speakers 16 is silenced while a call is taken.

Digital sources of audio may be encoded in the system known in the art as MP-3 or the equivalent. The 32 megabyte flash memory 65 is preferably written in a separate system. Each megabyte, when decoded will produce about 2 minutes of high fidelity stereo music. Under control of the control bus 52, the flash memory module 65 is read into a digital source select function 66. The digital stream is expanded in an MP-3 decoder 68, converted into the two required analog signals in the digital to analog converter 58 and selected by the audio select module 54, amplified in by the amplifier module 62,and drives the headphone speakers 70. The canned message ROM 67 operates the same way. It should be noted that canned messages are typically monaural and therefore, 4 minutes of audio are available per megabyte of ROM.

SUMMARY OF THE ACHIEVEMENTS OF THE OBJECTS OF THE INVENTION

It is readily apparent that I have invented a personal, portable entertainment and communication device for a person on the move. The invention provides high fidelity portable music from off-the-air or a full hour of prerecorded music as the user selects. The invention provides a personal, portable entertainment and communication device having both cellular telephone and pager capability via a light weight, logical fashion. The invention provides a personal, portable entertainment and communication device that has real time features of time, day, month, and year as well as flexible timer functions. The invention provides the user with flexible ergonomically superior means to control the manifold functions of the invention by a keypad with an ergonomically optimized division of function control into touch-screen menu navigation and preprinted key tops. The invention provides an optimally rugged device with substantially no moving parts.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A personal entertainment and communication apparatus comprising:

a headset portion housing and generally comprising a pair of amplified speakers, a microphone, means for providing digitally encoded music electronically connected to said pair of amplified speakers, a receiver, a remote unit worn as a watch, wherein the remote unit includes controls and a transmitter configured to transmit control signals to the receiver to control the digitally encoded music; and a control/display portion communicably linked to said headset portion generally comprising a cellular communication transceiver for sending and receiving cellular communication signals, means for selecting and routing system input signals, said system input signals including the digitally encoded music, the cellular communication signals and system components signals, said selecting and routing means electronically connected to said cellular communication transceiver, said means for providing digitally encoded music, said microphone and said pair of amplified speakers, user interface means electronically connected to said selecting and routing means, and means for providing power electrically connected to said cellular communication transceiver, said selecting and routing means, said user interface means and said means for providing digitally encoded music.

2. A personal entertainment and communication apparatus according to claim 1 further comprising:

a radio tuner electronically connected to said selecting and routing means and said power providing means.

3. A personal entertainment and communication apparatus according to claim 1 further comprising:

a pager electronically connected to said selecting and routing means and said power providing means.

4. A personal entertainment and communication apparatus according to claim 3 wherein said selecting and routing means comprises:

means for transmitting audio alert signals corresponding to the paging signals, said audio alert transmitting means electronically connected to said selecting and routing means and said pager.

5. A personal entertainment and communication apparatus according to claim 1 wherein said means for providing digitally encoded music is an MP-3 digital music player.

6. A personal entertainment and communication apparatus according to claim 1 wherein said means for providing digitally encoded music is a mini-compact disk player.

7. A personal entertainment and communication apparatus according to claim 6 further comprising, a receiver in the head phone set, and a remote unit worn as a watch, the remote unit including compact disc player controls and a transmitter configured to transmit control signals to the receiver to control the compact disc player.

8. A personal entertainment and communication apparatus according to claim 1 wherein said selecting and routing means comprises:

means for displaying time-of-day information electronically connected to said user interface means; and means for transmitting audio alert signals corresponding to the communication signals, said audio alert transmitting means electronically connected to said selecting and routing means and said cellular communication transceiver.

9. A personal entertainment and communication apparatus according to claim 1 wherein said user interface means comprises:

a keypad having a plurality of keys for volume control, radio tuning and digital music playback control, said keypad electronically connected to said selecting and routing means; and a visual display electronically connected to said selecting and routing means and said power providing means.

10. A personal entertainment and communication apparatus according to claim 1 wherein said headset portion further comprises:

a speaker housing having a latchable door for receiving a module with encoded digital music thereon within said speaker housing.

11. A personal entertainment and communication apparatus according to claim 1 further comprising:

a magnetic tape player electronically connected to said selecting and routing means and said power providing means.

12. A personal entertainment and communication apparatus according to claim 1, wherein said selecting and routing means is configured to audibly notify a user through the headset when an incoming cellular call is received even while music is being played through said headset and wherein sound from said means for providing digitally encoded music is silenced when the call is taken by the user.

13. A personal entertainment and communication apparatus according to claim 1, wherein said headset is communicably linked to the control/display portion by a group consisting of an electronic cable, infrared receiver/transmitter, radio frequencies, or microwave frequencies.

* * * * *